United States Patent
Koiwai et al.

(10) Patent No.: US 6,487,025 B2
(45) Date of Patent: Nov. 26, 2002

(54) LENS BARREL HAVING A PLURALITY OF LENS FRAMES WHICH ARE RELATIVELY MOVABLE IN FORWARD AND BACKWARD DIRECTIONS

(75) Inventors: Tamotsu Koiwai, Akiruno (JP); Tatsuo Takanashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/821,661

(22) Filed: Mar. 29, 2001

(65) Prior Publication Data

US 2001/0026401 A1 Oct. 4, 2001

(30) Foreign Application Priority Data

Mar. 31, 2000 (JP) ........................................ 2000-099330
Mar. 31, 2000 (JP) ........................................ 2000-099331

(51) Int. Cl.[7] .............................................. G02B 15/14
(52) U.S. Cl. ......................................... 359/699; 359/700
(58) Field of Search ................................ 359/699, 700, 359/701, 703, 704

(56) References Cited

U.S. PATENT DOCUMENTS 4,272,160 A * 6/1981 Uesugi ....................... 359/700
4,707,083 A * 11/1987 Iizuka et al. ................ 359/700
5,210,644 A * 5/1993 Nomura ...................... 359/694
6,373,641 B2 * 4/2002 Koiwai ....................... 359/694

FOREIGN PATENT DOCUMENTS

| JP | 2000-89077 | 3/2000 |
| JP | 2000-131588 | 5/2000 |
| JP | 2000-131589 | 5/2000 |

* cited by examiner

Primary Examiner—Ricky Mack
(74) Attorney, Agent, or Firm—Frishauf, Holtz, Goodman & Chick, P.C.

(57) ABSTRACT

In a lens barrel, a group-2 lens frame, which is movable forwardly and backwardly, is fit into an inner peripheral portion of an M-cam frame which is rotatably supported. A cam groove, into which a cam follower fits, is provided at the M-cam frame. A shaft hole, into which a shaft portion of the cam follower is press-fit and fixed, is provided at the group-2 lens frame. Two edge portions are formed at the shaft portion. Two conical slide faces are provided at a portion which slides at the cam groove of the cam follower. The two edge portions are provided at end portions of the slide faces. When the cam follower attempts to tilt, the edge portions of the shaft portion bite-into a cam face, and prevent a fit-together state of the shaft portion from coming out of place. Further, when an external force acts on the cam follower, the edge portions of the conical slide faces bite into the cam groove such that a fit-together state of the cam follower is prevented from coming out of place.

26 Claims, 10 Drawing Sheets

LENS BARREL HAVING A PLURALITY OF LENS FRAMES WHICH ARE RELATIVELY MOVABLE IN FORWARD AND BACKWARD DIRECTIONS

This application claims benefit of Japanese Applications No. 2000-099330 filed in Japan on Mar. 31, 2000 and No. 2000-099331 filed in Japan on Mar. 31, 2000, the contents of which are incorporated by this reference.

BACKGROUND OF THE INVENTION

1. Field of the Invention

The present invention relates to a lens barrel which has a plurality of lens frames which are relatively movable in forward and backward directions.

2. Related Art Statement

In a conventional lens barrel having a lens frame which is able to move in forward and backward directions, generally, a mechanism which combines a cam groove which is slanted with respect to the optical axis and a cam follower which is fit into the cam groove so as to be freely slidable, has been used as a mechanism for driving the cylindrical lens frame in forward and backward directions. Conventionally, a structure in which the entire slide face of the cam follower is driven to merely slide on a cam slide face has been used as the sliding mechanism for the cam follower which is fit in the cam groove.

However, lens barrels have become smaller due to demands in recent years to make products smaller and more light-weight. Further, there has been the trend to make the thickness of the built-in lens frame smaller. Thus, the lens frame itself has come to be easily deformable. In lens barrels having the above-described conventional structure, when a force greater than needed was applied to the cam follower, there was the concern that the lens frame would deform and the cam and the cam follower would disengage.

On the other hand, in the structure for fixing the above-described conventional cam follower at the lens frame, a fixing structure was used in which a straight shaft portion of the cam follower was press-fit into a fixing hole of the lens frame.

The size of the lens frame has become smaller due to demands in recent years to make products more compact and more light-weight, and there has been the trend to make the lens frame thinner as well. Accordingly, in the above-described cam follower fixing structure, the dimensions of the shaft portion of the cam follower press-fit into the lens frame were also made extremely small. Thus, in cases in which a force greater than needed was applied to the cam follower, there was the fear that the shaft portion which was press-fit in would come out or would be unsteady. Note that there are problems, in terms of the production process and in terms of product management, in using an adhesive in the fixing of the shaft portion, and thus, it is difficult to use an adhesive in practice.

SUMMARY OF THE INVENTION

The present invention was devised in order to overcome the above-described problems, and an object of the present invention is to provide a lens barrel having a mechanism for moving a frame forward and backward to which a cam follower is applied, wherein it is difficult for a sliding fit-together portion of the cam follower to come out of place, wherein it is difficult for offset to arise at the portion of the cam follower fixed to the lens frame, wherein the frame can be made more compact, and wherein smooth driving in forward and backward directions is made possible.

One lens barrel of the present invention has a first frame having a cam groove which includes a slide face; a second frame which moves relative to the first frame; and a cam follower, provided at the second frame and having a cam follower slide face which slides on the slide face of the cam groove, the cam follower having, on the cam follower slide face, at least two edges for biting-into the slide face of the cam groove. When the cam follower attempts to tilt, the edges bite into the cam follower slide face of the cam groove, such that the fit-together state therebetween is prevented from coming out of place.

Another lens barrel of the present invention has a frame member having a hole; and a cam follower having a shaft portion which is fit together with and mounted to the hole of the frame member, wherein a plurality of edges are formed at a surface of a fit-together portion of the shaft portion which is fit together with the hole. In a state in which the shaft portion is fit together with the hole, the edges bite into the hole, so as to prevent the cam follower from being offset from the frame member.

Other features and advantages of the present invention will become apparent from the following description of the invention which refers to the accompanying drawings.

BRIEF DESCRIPTION OF THE DRAWINGS

FIG. 6 is a vertical cross-sectional view of a state in which, in the lens barrel of the embodiment of FIG. 1, the cam follower of FIG. 5 is fixed to the M-cam frame, and is built into a rotating frame or the like.

FIG. 18 (B) is a partial enlarged view of an edge portion of a shaft portion of the cam follower of FIG. 17.

DETAILED DESCRIPTION OF THE PREFERRED

Hereinbelow, a description will be given of an embodiment of the present invention with reference to the drawings.

Figure 1:
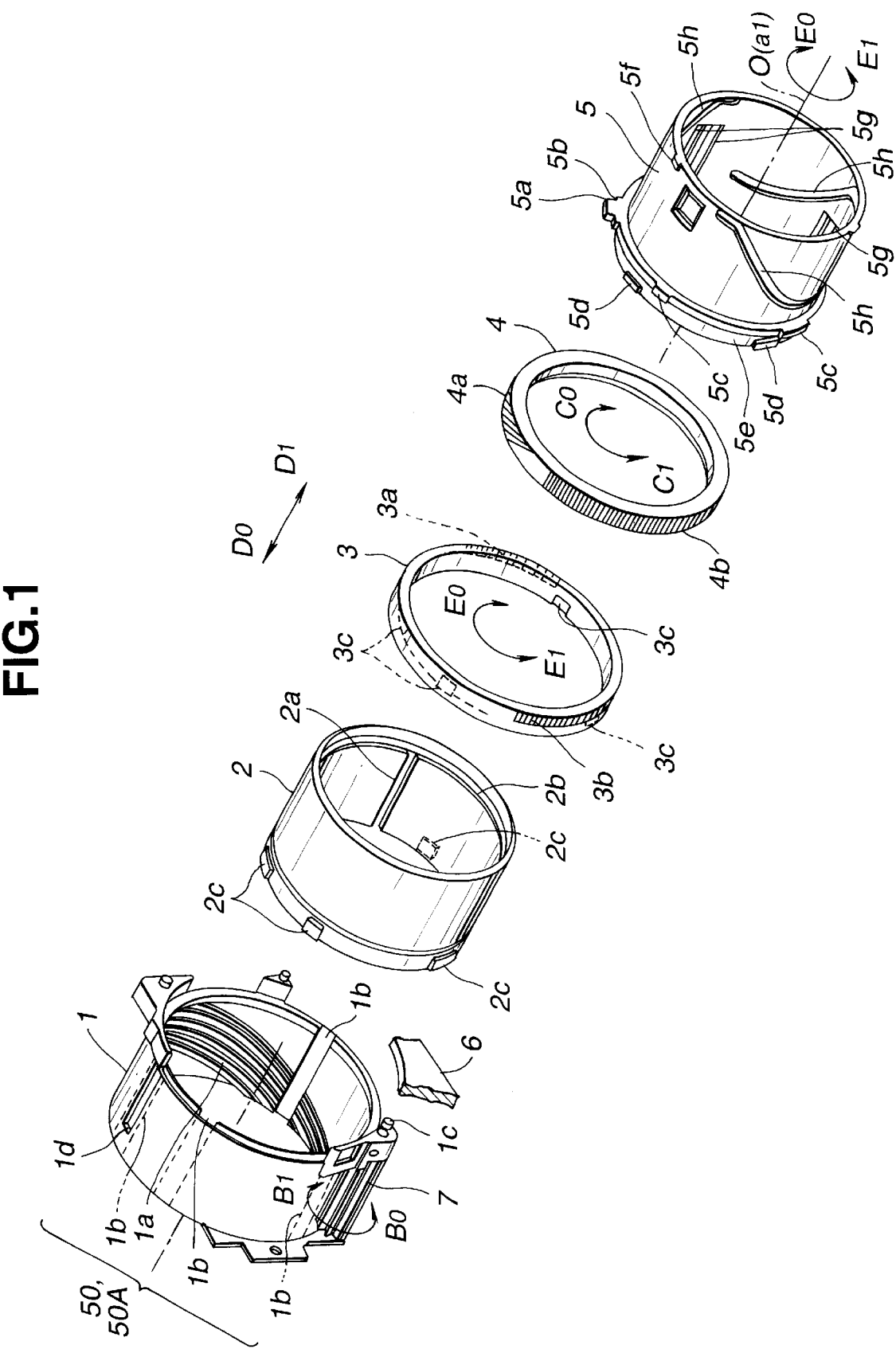
FIG. 1 is an exploded perspective view of an embodiment of a collapsible-barrel drive system including a lens barrel according to the present invention.
Figure 2:
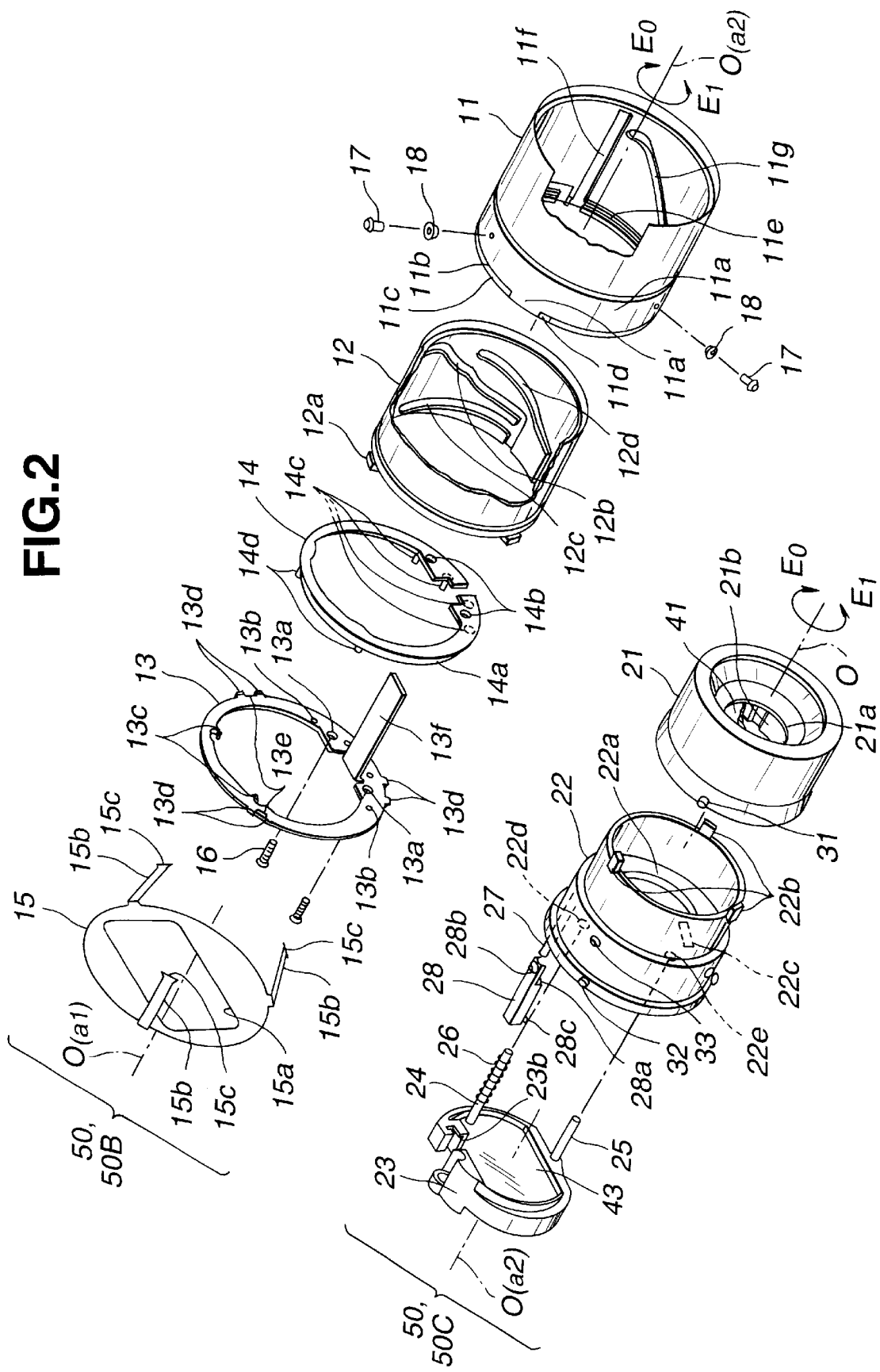
FIG. 2 is an exploded perspective view showing lens-group drive systems and lens-group frame sections of the lens barrel of the embodiment of FIG. 1.
Figure 3:
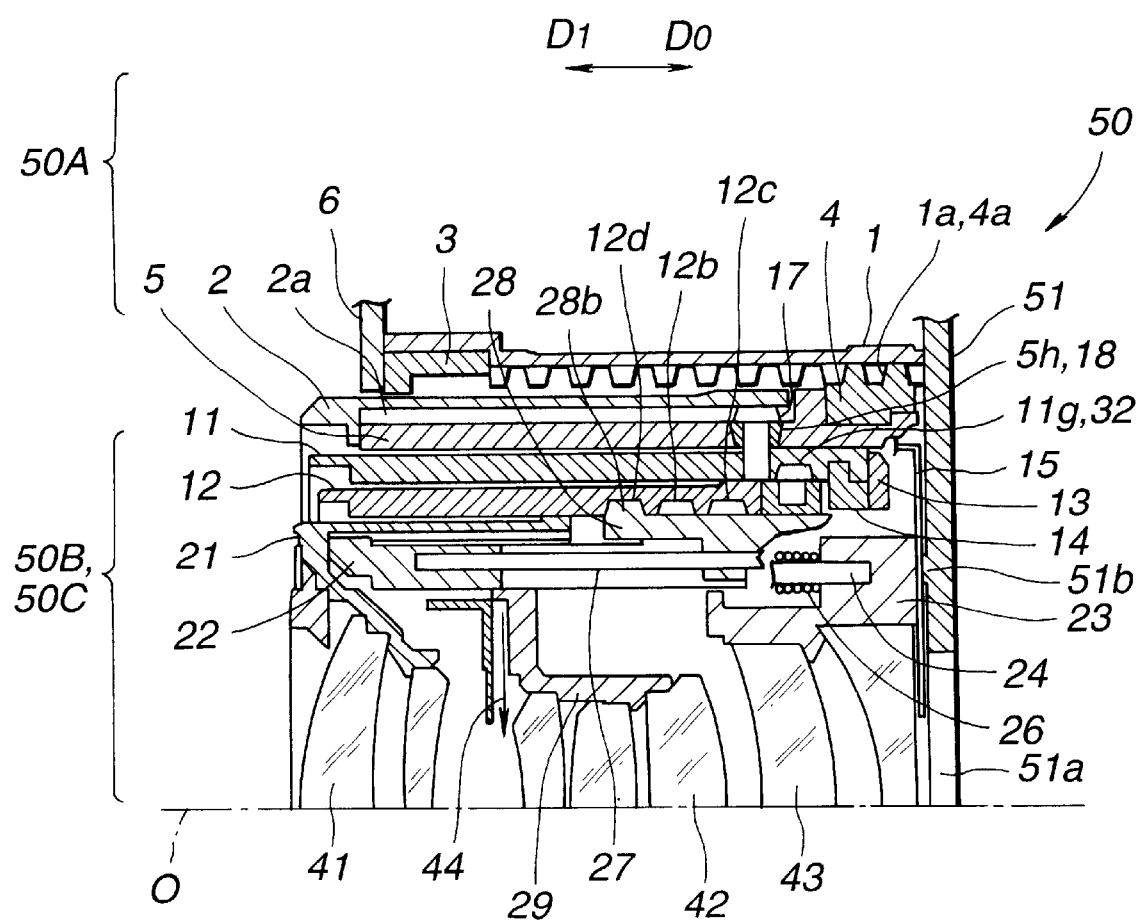
FIG. 3 is a vertical cross-sectional view showing a collapsed-barrel state of the lens barrel according to the embodiment of FIG. 1.
Figure 4:
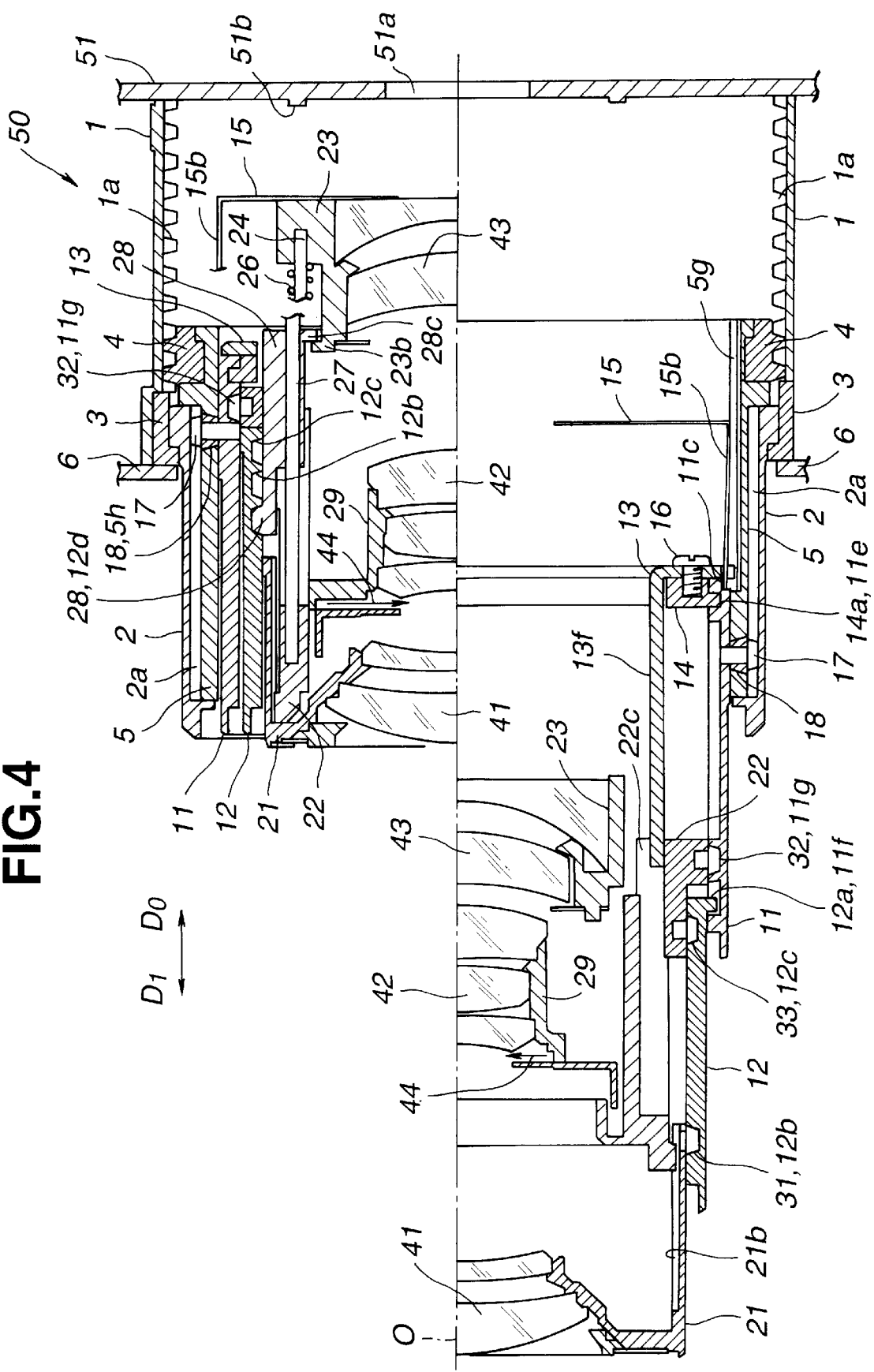
FIG. 4 is a vertical cross-sectional view of the lens barrel of the embodiment of FIG. 1, the upper half showing an image-capturing preparation state and a wide-angle state and the lower half showing a telescopic state.

FIGS. 1 and 2 are exploded perspective views of an embodiment of a lens barrel 50 according to the present invention. FIGS. 3 and 4 are vertical cross-sectional views of the lens barrel 50 in different states; FIG. 3 is a view of a collapsed-barrel state; FIG. 4 shows an image-capturing preparation state or a wide-angle state in the upper half portion, and a telescopic state in the lower half. Referring back to FIGS. 1 and 2, the individual components are not shown in assembly orientation for ready understanding.

The lens barrel 50 has collapsible-barrel drive system 50A, a lens-group drive system 50B, and a lens-group frame section 50C. The collapsible-barrel drive system 50A in FIG. 1 extends and retracts the lens barrel between a collapsed-barrel position and an image-capturing preparation position, that is, a collapsible-barrel drive region. The lens-group drive system 50B extends the individual lens-group frames shown in FIG. 2.

As shown in FIG. 1, the collapsible-barrel drive system 50A has a stationary frame 1, a rotating frame 2, a helicoid ring 4, and a moving frame 5. The stationary frame 1 is fixed to and supported mainly by a camera body (not shown) and has a helicoid-ring drive gear 7 and a drive ring 3, which is the drive member. The rotating frame 2 is a lens frame that extends and retracts between the collapsed-barrel position and the image-capturing preparation position, and rotationally moves between a wide-angle position and a telescopic position at the image-capturing preparation position. The helicoid ring 4 is rotatably and movably supported by the moving frame 5, described below. The moving frame 5 is a lens frame that moves linearly with the rotating frame 2 between the collapsed-barrel position and an image-capturable position.

The individual members of the collapsible-barrel drive system 50A are described below in more detail. The stationary frame is fixed to and supported by a camera body 51 (FIG. 3). It has a linearly-guiding groove 1d for receiving a tab of the moving frame which opens through an exterior peripheral section. It also has a female helicoid thread 1a and linearly-guiding grooves 1b in an interior peripheral section. The drive ring 3 is rotatably drivingly received in a drive-ring-supported section 1c. A thrust-direction position of the drive ring 3 is defined by a stopper plate 6. The helicoid-ring drive gear 7 extends axially and is rotatably supported by an exterior peripheral section. A toothed section of the helicoid-ring drive gear 7 is exposed to the interior peripheral section of the stationary frame 1.

The linearly-guiding grooves 1b and other linearly-guiding grooves described below are provided parallel to an optical axis O of an image-capturing optical system.

The aforementioned drive ring 3 has a zoom gear 3a and a view finder gear 3b in an exterior peripheral section, and has groove-like indented sections 3c in an interior peripheral section. The zoom gear 3a drivingly engages with a zoom drive system (not shown). The view finder 3b drivingly engages with a view finder drive system (not shown).

At the rotating frame 2, a linearly-guiding groove 2a which is a valley-shaped groove is provided at the inner peripheral portion, an inner peripheral groove 2b is provided at the inner peripheral front (object to be photographed side) end portion, and projections 2c are provided at the outer peripheral portion. Note that the linearly-guiding groove 2a has a groove shape in which the groove width increases toward the optical axis center. A tapered cam follower 17, which is fixed to an M-cam frame 11 which will be described later, is fit together slidably with the linearly-guiding groove 2a.

The aforementioned helicoid ring 4 has a male helicoid thread 4a and a drive gear 4b on an exterior peripheral section.

The aforementioned moving frame 5 has an electronic-flash drive projection 5a, linearly-guiding-groove projections 5b and 5c, projections 5d, and a peripheral guide 5e formed between the projections 5d and a ring-like rib connecting the projections 5c and the projections 5b, and the individual projections 5c on an exterior peripheral section. The moving frame 5 also has a projection 5f at the end, and three lines of linearly-guiding grooves 5g in an interior peripheral section.

Moreover, three cam grooves 5h, which are valley shaped grooves which pass through the inner and outer peripheries, are provided at the moving frame 5. The cam groove 5h has an oblique groove portion which is slanted with respect to the optical axis O, and has a groove shape in which the groove width decreases toward the optical axis center. Tapered cam followers 18, which are supported at the M-cam frame 11 described below, are fit together with the cam grooves 5h in a rotatable state.

In the collapsible-barrel drive system 50A constructed from the aforementioned members, the helicoid ring 4 is rotatably received in the moving frames 5 via the peripheral guide 5e and axially controlled. The lens-group drive system 50B and the lens-group frame section 50C, described below, are assembled so as be rotatable, extendable, and retractable. At this time, the moving frame 5 is received in the interior peripheral section of the rotating frame 2. In this state, since the projection 5f engages with the interior peripheral groove 2b, the moving frame 5 is rotatably supported and axially controlled in relation to the rotating frame 2.

The rotating frame 2 and the moving frame 5 are individually inserted into the stationary frame 1 so as to move linearly when the projections 2c, 5c, and 5b are individually received in the linearly-guiding grooves 1b and 1d. At this time, the male helicoid thread 4a of the helicoid ring 4 is engaged with the female helicoid thread 1a of the stationary frame 1; and the drive gear 4b is engaged with the helicoid-ring drive gear 7.

When the aforementioned rotating frame 2 and moving frame 5 are received in the stationary frame 1, and when the moving frame 5 and the rotating frame 2 are in the collapsible-barrel position on the film side (FIG. 3), when the helicoid-ring drive gear 7 is rotated clockwise (as viewed from the subject, in direction B1, the helicoid ring 4 rotates counterclockwise, in direction C1. This rotational movement causes the moving frame 5 and the rotating frame 2 to integrally extend in direction D1 (toward the subject) up to the image-capturing preparation position (upper half of FIG. 4).

When the moving frame 5 and the rotating frame 2 have reached the image-capturing preparation position, the rotating frame 2 disengages from the linearly-guiding grooves 1b of the stationary frame 1, and is received in the side of the indented sections 3c of the drive ring 3.

When the drive ring 3 is assembled with the rotating frame 2, when the drive ring 3 is rotated in direction E0 by the zoom drive system, the rotating frame 2 rotates slightly in the same direction from the image-capturing preparation position and reaches the wide-angle position, which is an image-capturing position. When the rotating frame 2 rotates farther in the same direction described above, it is zoom-driven to the telescopic position.

When the drive ring 3 is rotated in the reverse direction, that is, in direction E1, the rotating frame 2 rotates from the zoomed position to the image-capturing preparation position. When the helicoid-ring drive gear 7 is rotated farther in the reverse direction to the above, that is, in direction B0, the rotating frame 2 and the moving frame 5 can be retracted to the collapsed-barrel position.

Hereinbelow, a description will be given of the lens-group drive system 50B.

As shown in FIG. 2, the lens-group drive system 50B has an M-cam frame 11, an F-cam frame 12, a key ring 13, and a movable flare aperture 15. The M-cam frame 11 which is a first frame made of resin is inserted into the moving frame 5 and is driven forwardly or backwardly. The F-cam frame 12 rotates with the M-cam frame 11, and extends and retracts via a group-2 frame 22. The key ring 13 is fitted with a key stopper 14 and guides lens-group frame linearly. The movable flare aperture 15 moves linearly and is supported by the M-cam frame 11.

Hereinbelow, the individual members of the lens-group drive system 50B are described in more detail.

The M-cam frame 11 is a member which fits in an inner periphery of the aforementioned moving frame 5 so as to be able to rotate and so as to be able to move in forward and backward directions. At an outer peripheral portion of the M-cam frame 11 are provided an outer peripheral face 11a serving as a slide face along which a distal end convex portion 15c of the movable flare aperture slides, a stepped side face 11b serving as a stepped face, a stepped peripheral face 11c, an end portion outer peripheral face 11a' having a predetermined width, and a peripheral direction oblique face 11d which is adjacent to the stepped peripheral face 11c in the peripheral direction.

Three cam followers 17 are fixed to and held at the outer peripheral portion of the M-cam frame 11 by shaft portions 17a thereof being press-fit in. Each cam follower 17 has a slide face which is tapered such that the diameter increases toward the optical axis center. Further, the three cam followers 18, which are supported so as to be freely rotatable and which are tapered such that the diameters decrease toward the optical axis center, are disposed at the shaft portions 17a of the cam followers 17.

The stepped peripheral face 11c described above is formed in an end section on the film side with one step indented down from the exterior peripheral surface 11a. The stepped peripheral face 11c is a first slide face on which the end protrusion 15c of the arm section 15b of the movable flare aperture 15 slides. The width of the stepped peripheral face 11c in the axial direction is slightly larger than the width of the end protrusion 15c in the axial direction so that the end protrusion 15c can slide in the peripheral direction.

An inner peripheral groove 11e provided at the film face side end portion, three linearly-guiding grooves 11f, and three group-2 cam grooves 11g each having a slanted groove portion which is oblique with respect to the optical axis O, are provided at the inner peripheral portion of the M-cam frame 11.

The three cam followers 17 are press-fit and fixed to the outer peripheral portion of the M-cam frame 11 by the shaft portions 17a thereof. Further, the three cam followers 18 are rotatably fit with the shaft portions 17a of the three cam followers 17. Each of the cam followers 18 has a conical face at which the diameter decreases toward the optical axis center.

Figure 5:
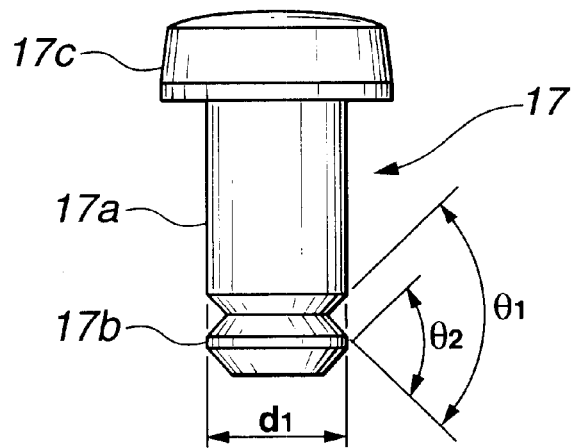
FIG. 5 is a front view of a cam follower which is fixed to an M-cam frame of the lens barrel of the embodiment of FIG. 1.
Figure 6:
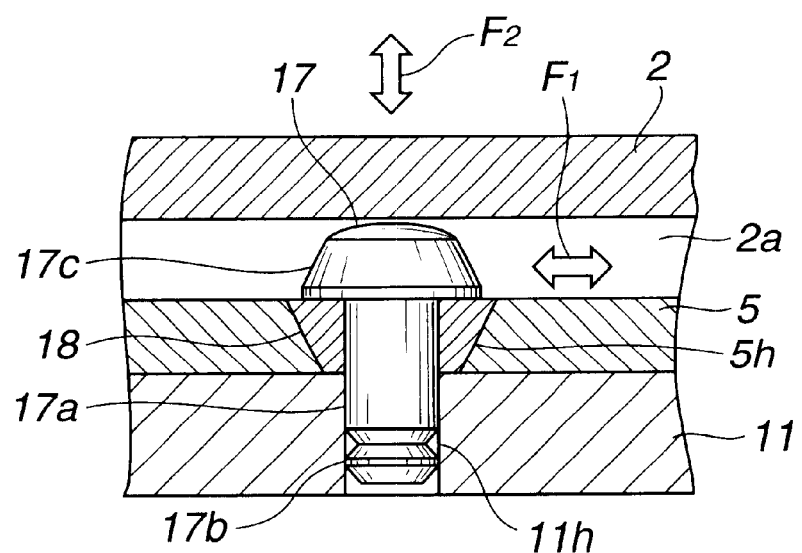

FIG. 5 is a front view of the cam follower 17 which is fixed to the M-cam frame 11, and FIG. 6 is a sectional view of an assembled state of the cam follower 17. FIG. 6 illustrates a state in which the cam follower 17 is fixed to the M-cam frame 11, the inserted cam follower 18 is fit into the cam groove 5h of the moving frame 5, and the slide portion of the cam follower is fit into the cam groove 2a of the rotating frame 2.

The cam follower 17 has a slide face 17c, the shaft portion 17a, and an edge portion 17b. The slide face 17c is a conical face shape whose diameter increases toward the shaft portion 17a side (i.e., toward the central side of the optical axis O in the state in which the shaft portion is fixed). The edge portion 17b is provided at the end portion beneath the shaft portion. The edge portion 17b has the same diameter as a diameter d1 of the shaft portion 17a, has an edge angle θ2 of 90°, and has, at the shaft portion 17a side thereof, a V-shaped groove portion having a groove angle θ1 of 90°.

In a state in which the shaft portion 17a of the cam follower 17 is fixed and mounted in a shaft hole 11h of the M-cam frame 11 by press-fitting and/or adhesion, the edge portion 17b is positioned within the shaft hole 11h. Then, when an external force acts on the cam follower 17 such that the cam follower 17 attempts to tilt, the edge portion 17b bites-into the shaft hole 11h. Accordingly, the slide face 17c and the cam follower 18 are pushed via the rotating frame 2 and the cam groove of the moving frame 5. Even if forces F1, F2 in the direction along the optical axis O and the direction orthogonal thereto act on the shaft portion 17a (see FIG. 6), pulling out of the shaft portion 17a is prevented by the biting-in of the edge portion 17b.

The F-cam frame 12 is extendably and retractably received in an interior peripheral section thereof. The F-cam frame 12 has three protrusions 12a on an exterior peripheral section thereof. Also, on an interior peripheral section thereof, the F-cam frame 12 has three group-i cam grooves 12b, three group-2 cam grooves 12c, and one group-3 cam groove 12d, which are oblique to the optical axis O.

The movable flare aperture 15 is a very thin planar member. It has an opening 15a formed in a central portion and three arm section 15b. Each of the three arm sections 15b is elastically deformable and protrudes and inclines slightly from a direction parallel to the optical axis O prior to assembly. The arm sections 15b have end protrusions 15c extending in the peripheral direction. In the assembled state, the end protrusions 15c elastically deform and are urged by a predetermined force to contact the exterior peripheral surface 11a or the stepped peripheral face 11c of the M-cam frame 11.

The aforementioned key ring 13 is a planar member for guiding the individual lens-group frames linearly. It has screw holes 13a, positioning holes 13b, three double-pronged protrusions 13d, grooves 13e between the individual double-pronged protrusions 13d, two cutouts 13c, and a linearly-guiding key 13f extending in the direction corresponding to the optical axis O.

The key stopper 14 is elastically deformable and has a circular cut out. The key stopper 14 has a ring 14a provided along the periphery, two screw holes 14b, positioning pins 14c at both sides of each of the screw holes 14b, and two stopper pins 14d. The positioning pins 14c can be received by the corresponding positioning holes 13b. Each of the stopper pins 14d has an engaging tab 14e.

In the lens-group drive system 50B constructed from the above individual members, the F-cam frame 12 first is axially and slidably reconnected in the M-cam frame 11 when the protrusions 12a are engaged with the linearly-guiding grooves 11f in the interior peripheral section thereof. Then, the individual lens-group frames, described below, are assembled into interior peripheral sections of the M-cam frame 11 and the F-cam frame 12 so as to be expendable and retractable.

The M-cam frame 11, in which the lens-group frames and the like are installed, then is inserted into the interior peripheral section of the moving frame 5 of the collapsible-barrel drive system 50A so as to be rotatable and movable. Then, the cam followers 18 of the M-cam frame 11 are slidably engaged with cam grooves 5h. The cam followers 17, which define the axes of the cam followers 18, are inserted into the moving frame 5 and slidably engaged with the linearly-guiding grooves 2a of the rotating frame 2. The M-cam frame 11 is integrally rotated and moved by the rotating frame 2, then is driven forwardly and backwardly, that is, in a direction corresponding to the optical axis, by means of the cam grooves 5h of the moving frame 5.

When the key stopper 14 is expanded in the radial direction, the ring 14a is inserted into the interior peripheral groove 11e of the M-cam frame 11. The key stopper 14 is assembled with the key ring 13, the relative positioning of each being defined by the positioning pins 14c and the positioning holes 13b, then fixed by screws 16. Accordingly, the key ring 13 is rotatably supported and is axially controlled on the film side end in relation to the M-cam frame 11.

The double-pronged protrusions 13d are slidably engaged with the linearly-guiding grooves 5g. Therefore, the key ring 13 does not rotate and is driven linearly. In addition, since the linearly-guiding key 13f of the key ring 13 is slidably engaged with a linearly-guiding hole 22c of a group-2 lens frame 22, described below, the group-2 lens frame 22, a group-1 lens frame 21, supported by the group-2 lens frame 22, and a group-3 lens frame 23 are guided linearly.

The movable flare aperture 15 is installed such that the three arm sections 15b pass through the grooves 13e of the key ring 13 from the film side and the end protrusions 15c slide on the exterior peripheral surface 11a of the M-cam frame 11 or the stepped peripheral face 11c of the M-cam frame 11.

Hereinbelow, the aforementioned lens-group frame section 50C is described.

The lens-group frame section 50C has the group-1 lens frame 21, the group-2 lens frame 22, a movable follower 28, the group-3 lens frame 23, and a focusing frame 29. The group-1 lens frame 21 is installed in the M-cam frame 11 and the F-cam frame 12 and has lens-group-supporting frames that move linearly forwardly and backwardly, and has a group-1 lens 41. The group-2 lens frame 22 which is a second frame made of resin is guided linearly via the key ring 13 and is driven forwardly and backwardly by the M-cam frame 11. The movable follower 28 is driven forwardly and backwardly via the F-cam frame 12. The group-3 lens frame 23 is driven forwardly and backwardly via the movable follower 28 and supports a group-3 lens 43. The focusing frame 29 is supported by the group-2 lens frame 22, is driven linearly by a focusing-drive system (not shown), and supports a group-2 lens 42 (FIGS. 3 and 4).

The group-2 lens frame 22 has three cam followers 32, three cam followers 33 in an exterior peripheral section, and three protrusions 22b in an end section. In an exterior peripheral section, the group-2 lens frame 22 has the linearly-guiding hole 22c, an axis hole 22d, a cutout 22e, a guiding axis 27, and an opening 22a (FIG. 2). The linearly-guiding hole 22c receives the linearly-guiding key 13f. The axis hole 22d is provided in the direction of the optical axis O. The guiding axis 27 is stationary and supported in the direction of the optical axis O. The opening 22a is used for installation of a shutter 44.

The group-1 lens frame 21 has an opening 21a supporting the group-1 lens 41, three cam followers 31 in an exterior peripheral section, and linearly-guiding grooves 21b in an interior peripheral section.

The movable follower 28 is an elongated member for regulating the extending/retracting position of the group-3 lens frame 23. It has an axis hole 28a, a cam follower 28b, and an engaging tab 28c. The axis hole 28a slidably receives the guiding axis 27 of the group-2 lens frame 22. The engaging tab 28c engagingly stops the group-3 lens frame 23.

The group-3 lens frame 23 is slidably supported by the group-2 lens frame 22 in the linear direction. It has fixed guiding axes 24 and 25, an engaging section 23b corresponding to the engaging tab 28c, and an opening that supports the group-3 lens 43.

The focusing frame 29 supports the group-2 lens 42 and is supported by the group-2 lens frame 22 so that it can move forwardly and backwardly. The focusing frame 29 is driven forwardly and backwardly by means of a focusing-drive system (not shown) (FIGS. 3 and 4).

In the lens-group frame section 50C described above, the protrusions 22b on the exterior peripheral section on the subject side are slidable engaged with the linearly-guiding grooves 21b of the group-1 lens frame 21, then the group-1 lens frame 21 is assembled with the group-2 lens frame 22. The group-3 lens frame 23 is assembled therewith such that the guiding axes 24 and 25 are slidably received into the axis hole 22d and the cutout 22e. respectively. A pushing spring 26 is received by the guide axis 24, urging, in the direction of the film, the group-3 lens frame 23.

The guiding axis 27 is slidably inserted into the axis hole 28a, then the movable follower 28 is assembled with the group-2 lens frame 22. While the camera body 51 is not exerting force on the group-3 lens frame 23, the engaging tab 28c of the movable follower 28 engages with the engaging section 23b of the group-3 lens frame 23, thereby defining the position of the group-3 lens frame 23.

The lens-group frame section 50C is installed in the M-cam frame 11 and the F-cam frame 12 of the lens-group drive system 50B so that it can move linearly forwardly and backwardly. The linearly-guiding key 13f of the key ring 13 is slidably guided linearly through the linearly-guiding hole 22c of the group-2 lens frame 22, thereby supporting the group-1 and group-3 lens frames 21 and 23, respectively, and the movable follower 28 integrally with the group-2 lens frame 22 so that they can move linearly forwardly and backwardly.

The cam followers 31 of the group-1 lens frame 21a reengaged with the corresponding group-1 cam grooves 12b of the F-cam frame 12. The cam followers 32 and 33 of the group-2 lens frame 22 are engaged with the corresponding group-2 cam grooves 11g of the M-cam frame 12. The movable cam follower 28b is engaged with the group-3 cam groove 12d of the F-cam frame 12.

Having been configured as provided above, extending/retracting positions of members such as the individual frames are defined as described below with respect to the M-cam frame 11. The position of the F-cam frame 12 is defined by the group-2 lens frame 22 and the group-2 cam group-2 cam grooves of the F-cam frame 12. The position of the group-3 lens frame 23 is defined via the engaging tab 28c of the movable follower 28.

Here, the cam follower 32 which is fixed to the outer peripheral portion of the group-2 lens frame 22, the configuration of the cam groove 11g of the M-cam frame 11 into which the cam follower 32 is fit so as to be freely slidable, and sliding operation thereof will be described in detail.

Figure 7:
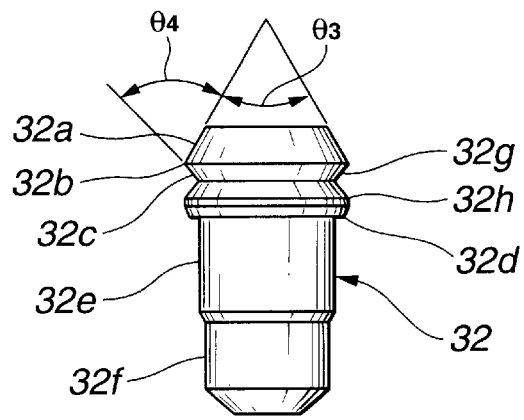
FIG. 7 is a front view of a cam follower which is fixed to a group-2 lens frame in the lens barrel of the embodiment of FIG. 1.
Figure 8:
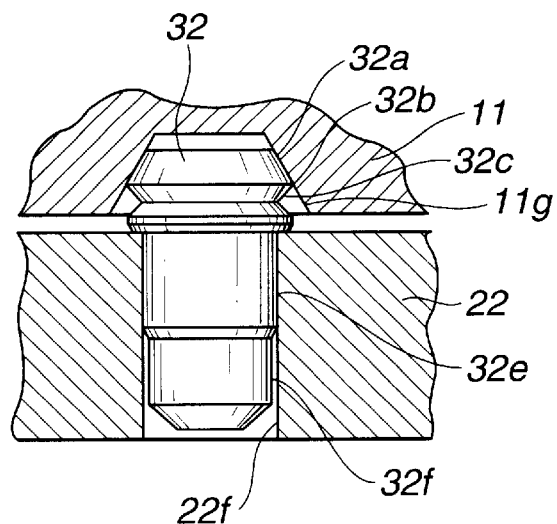
FIG. 8 is a sectional view of a state in which the cam follower of FIG. 7 is fit together with a cam groove of the M-cam frame in the lens barrel of the embodiment of FIG. 1.

FIG. 7 is a front view of the cam follower 32. FIG. 8 is a vertical sectional view showing a fit-together state of the cam groove 11g of the M-cam frame 11 and the cam follower 32 which is fixed to the group-2 lens frame 22.

The cam follower 32 has a slide face 32a, an edge portion 32b, a relief face 32c, a flange portion 32h, a seat portion 32d for press-fit mounting, and a shaft portion 32e. The slide face 32a is conical and has a taper angle (cone generator angle) θ3 which widens toward the shaft portion side as shown in FIG. 7. The edge portion 32b is provided at the shaft side maximum diameter portion of the slide face, i.e., at the end portion in the direction of moving away from the cam groove. The relief face 32c is a portion of a V-shaped groove 32g, and has a relief angle θ4 for forming the edge portion 32b. The flange portion 32h is beneath the V-shaped groove 32g. The shaft portion 32e has an introduction shaft portion 32f which is a guide for the press-fitting.

The shaft portion 32e is a shaft portion which is press-fit and/or adhered into a shaft hole 22f of the group-2 lens frame 22. The introduction shaft portion 32f has a slightly smaller diameter than the shaft portion 32e.

An oblique slide face, which is the cam face of the cam groove 11g of the M-cam frame 11, is a trapezoidal face corresponding to the taper angle θ3 of the slide face 32a of the cam follower 32. In a state in which the slide face 32a of the cam follower 32 is fit-in, as illustrated in FIG. 8, the slide face 32a is fit together such that the oblique slide face of the cam groove 11g is longer than the contact length of the slide face 32a, and the edge portion 32b is positioned within the oblique slide face of the cam groove 11g.

The rotating force and the forward and backward driving force of the M-cam frame 11 are transmitted to the group-2 lens frame 22 via the cam follower 32 which is fit in the cam groove 11g, such that the group-2 lens frame 22 is moved forwardly and backwardly. During this driving operation, a reaction force is generated by pressing at the abutment face of the oblique face of the cam groove 11g of the M-cam frame 11 and the slide face 32a of the cam follower 32.

Due to the reaction force, the M-cam frame 11 and the group-2 lens frame 22 attempt to deform toward the outside and toward the inside. As described above, in the case of the cam groove/cam follower structure of the conventional lens frame, there was the fear that the fit-together state of the cam groove and the cam follower of the lens frame would come apart due to this deformation. However, in a case in which the cam groove 11g and the cam follower 32 are combined, as illustrated in FIG. 8, the lower end edge portion 32b of the slide face 32a abuts the oblique slide face of the cam groove 11g. Thus, the edge portion 32 bites into the oblique slide face of the cam groove 11g which is made of resin. Due to this biting-in, a state of the cam groove 11g and the slide face 32a of the cam follower attempting to separate from each other can be restrained, and it is difficult for the fit-together portions thereof to come apart.

Hereinbelow, a description will be given of retraction and extension operations of the lens barrel 50 configured as above.

When the lens barrel 50 is in the collapsed-barrel state, as shown in FIG. 3, all the members such as the rotating frame 2 are maintained inside the immobilized frame 1. The group-3 lens frame 23 and the movable flare aperture 15 are urged by a protrusion 51b provided near an aperture 51a of the camera body 51 and placed in a stowed position. In this state, as shown in FIG. 7, the end protrusion 15c of the movable flare aperture 15 has slid forwardly on the exterior peripheral surface 11a of the M-cam frame 11.

To drive the lens barrel 50 from the collapsed-barrel state to the image-capturing preparation state, the helicoid-ring drive gear 7 is rotated in the direction B1, and the helicoid ring 4 is rotated in the direction C1. According to the rotation, the rotating frame 2 and the moving frame 5 are guided by the linearly-guiding grooves 1b and are integrally moved in direction D1, thereby extending the lens barrel 50 from the collapsed-barrel position to the image-capturing preparation position (upper half of FIG. 4). The moving frame 5 remains engaged with the linearly-guiding grooves 1d and 1b. However, the projections 2c disengage from the linearly-guiding grooves 1b and engage with the indented sections 3c, and according to the drive ring 3, the rotating frame 2 becomes rotatable.

When the drive ring 3 is further rotated by the zoom drive system by a slight angle from the aforementioned image-capturing preparation state, the lens barrel 50 assumes the wide-angle state as shown in the upper half of FIG. 4.

During the shift from the collapsed-barrel state to the image-capturing preparation state and the wide-angle state, the group-2 lens frame 22, the rotating frame 2, and the moving frame 5 integrally extend. The group-3 lens frame 23 are urged by the pushing spring 26 and thereby moves backwardly from the M-cam frame 11 and the group-2 lens frame 22. Then, the group-3 lens frame 23 moves backwardly from a wide-angle-ready position where the engaging tab 28c of the movable follower 28 engages with the engaging section 23b.

Also, during the aforementioned driving, the movable flare aperture 15 is pushed backwardly by the group-3 lens frame 23 with respect to the M-cam frame 11. The end protrusions 15c of the three arm sections 15b arrive over the exterior peripheral surface 11a' of the M-cam frame 11. When the M-cam frame 11 rotates slightly in the direction E0 up to the wide-angle position, the end protrusions 15c slide down the peripherally sloped face 11d and arrive over the stepped peripheral face 11c. Thus, the movable flare aperture 15 is located relative to the M-cam frame 11 to provide an intended normal function.

To drive the lens barrel 50 from the wide-angle state to a telescopic state, the drive ring 3 is rotated in the direction E0, and the rotating frame 2 is rotated in the same direction (lower half of FIG. 4). That is, the M-cam frame 11 rotates in direction E0 and extends along the cam grooves 5$h$ of the moving frame 5. The F-cam frame 12 is rotated by the linearly-guiding grooves 11$f$ integrally with the M-cam frame 11. The extending position is defined by the cam followers 33 of the group-2 lens frame 22, which engage with the group-2 cam grooves 12$c$.

Guided linearly by the key ring 13, the group-2 lens frame 22 is extended by the group-2 cam grooves 11$g$ of the M-cam frame 11 to a telescopic-ready position. The group-1 lens frame 21 is extended to the telescopic-ready position by the group-1 cam grooves 12$b$ of the F-cam frame 12 which engage with the cam followers 31. The position of the movable follower 28 is defined by the group-3 cam groove 12$d$, and the position of the group-3 lens frame 23 is determined by the cam follower 28$b$ of the aforementioned movable follower 28.

While the M-cam frame 11 rotates to extend and retract between the wide-angle state and the telescopic state, the movable flare aperture 15 is supported without being rotated by the grooves 13$e$ of the key ring 13. Thus, the movable flare aperture 15 is supported in a predetermined position spaced with respect to the M-cam frame 11 and provides an intended normal function.

To drive the lens barrel 50 from the wide-angle state to the image-capturing preparation state and further to the collapsed-barrel position, first, the drive ring 3 is rotated in the direction E1, thereby driving the lens barrel 50 to the image-capturing preparation state. In this state, the group-1 lens frame 21 and the group-2 lens frame 22 are extended within the moving frame 5. The group-3 lens frame 23 remains in a position where it is relatively moved backwardly with respect to the M-cam frame 11 (upper half of FIG. 4). The end protrusions 15$c$ rotate in the direction E1 and slide on the continuously sloped face 11$d$ over the exterior peripheral surface 11$a'$.

Subsequently, the helicoid-ring drive gear 7 is rotationally driven in the direction B0 so as to rotate the helicoid ring 4 in the direction C0. The moving frame 5 and the rotating frame 2 integrally move backwardly in a direction D0, and the projections 2$c$ of the rotating frame 2 disengage from the drive ring 3. When the helicoid ring 4 is further rotated, the rotating frame 2 moves integrally with the moving frame 5 in the direction D0 and is retracted to the collapsed-barrel position so as to be housed within the immobilized frame 1 (FIG. 3).

According to the above collapsed-barrel operation, the group-3 lens frame 23 and the movable flare aperture 15 are pushed by the protrusion 51$b$ of the camera body 51, overcome the urging force of the pushing spring 26, and move forwardly. As a result, the group-3 lens frame 23 is housed in the group-2 lens frame 22 (FIG. 3). The movable flare aperture 15 also moves forwardly relative to the M-cam frame 11 in the optical-axis direction, and the end protrusions 15$c$ slide forward on the exterior peripheral surface 11a from the exterior peripheral surface 11$a'$ of the M-cam frame 11 so as to be in a stowed state (FIG. 3).

In the lens barrel 50 of the above-described present embodiment, at the cam follower 17 which is press-fit into the shaft hole 11$h$ of the M-cam frame 11, the edge portion 17$b$ is provided at the shaft portion 17$a$ as illustrated in FIG. 6. When the cam follower attempts to tilt or is about to come out, the edge portion 17$b$ bites-into the shaft hole 11$h$.

Accordingly, for example, even if the thickness of the M-cam frame 11 is made thin, and due to deformation thereof, a force in the direction along the optical axis O or the direction orthogonal thereto acts on the shaft portion 17$a$ by the slide face 17$a$ or the other cam follower 18, coming out of the shaft portion 17$a$ is reliably prevented by the above-described biting-in. In particular, if the cam follower 17 is metal and the M-cam frame 11 is resin, the effects due to this biting-in are marked.

Further, at the driving mechanism of the cam groove and the cam follower at the M-cam frame 11 and the group-2 lens frame 22, as illustrated in FIG. 8, the edge portion 32$b$ is provided at the maximum diameter portion of the end portion of the conical slide face 32$a$ of the cam follower 32. This edge portion 32$b$ is made to abut the slide face of the cam groove 11$g$.

In a case in which, during rotation or forward or backward operation between the M-cam frame 11 and the group-2 lens frame 22, a pressing force in the direction of making the cam follower 32 fall over is applied to the fit-together portions of the cam groove 11$g$ and the slide face 32, even if, for example, the frame member is made thin and deforms or attempts to deform, the edge portion 32$b$ bites into the slide face of the cam groove 11$g$ of the M-cam frame 11. Due to the above-described biting-in, the coming apart of the fit-together state of the cam groove 11$g$ and the cam follower 32 is reliably prevented, and good forward and backward driving of the group-2 lens frame 22 can be achieved. In particular, if the cam follower 32 is made of metal and the M-cam frame 11 is made of resin, the effects due to this biting-in are marked.

Next, modified examples of the cam followers 17, 32 will be described.

Figure 9:
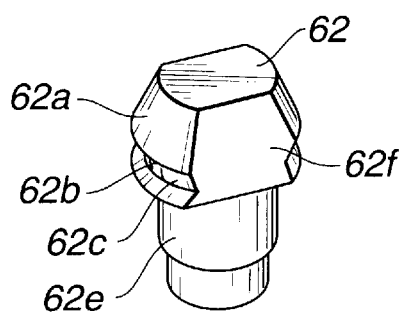
FIG. 9 is a perspective view of a cam follower of a first modified example of the cam follower in the lens barrel of the embodiment of FIG. 1.

First, a cam follower 62 illustrated in the perspective view of FIG. 9 is proposed as a first modified example of the cam followers. The cam follower 62 has a conical slide face 62$a$ in the same way as the cam follower 32 illustrated in FIG. 7. However, the side face of this conical face is a cut face 62$f$ which has been cut. In the same way as the cam follower 32, an edge portion 62$b$ and a relief face 62$c$ are press-fit, and/or a shaft portion 62$e$ for adhering are provided. The same effects as the cam follower 32 are obtained, and furthermore, less space is occupied by the cam follower 62.

Figure 10:
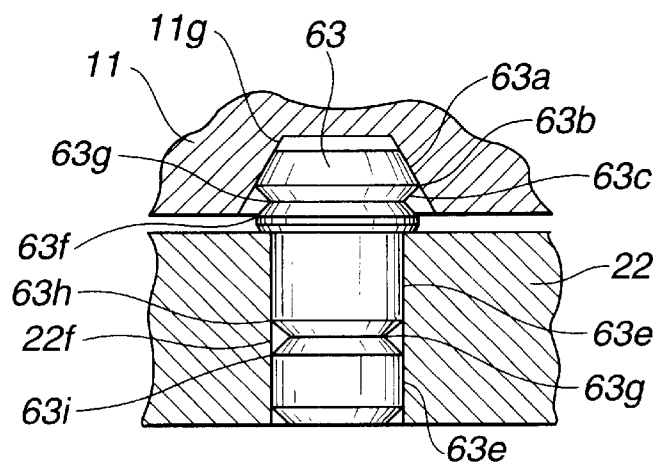
FIG. 10 is a sectional view of a fit-together state of a cam follower of a second modified example of the cam follower in the lens barrel of the embodiment of FIG. 1.

Further, a cam follower 63, which is illustrated in the sectional view of FIG. 10 illustrating an assembled state of the cam groove and the frame portion, is proposed as a second modified example of the cam followers. The cam follower 63 has, in the same way as the cam follower 32 shown in FIG. 7, a conical slide face 63$a$, an edge portion 63$b$, a relief face 63$c$, and a V-shaped groove portion 63g. However, the cam follower 63 differs from the cam follower 32 in that the cam follower 63 additionally has a V-shaped groove portion 63$g$ which is above a shaft portion 63$e$ which is the shaft which is press-fit and/or adhered into the shaft hole 22$f$ of the group-2 lens frame 22, and in that edge portions 63$h$, 63$i$ are formed at the cam follower 63.

In a case in which this cam follower 63 is applied, when an external force in the lateral direction or a pulling-out force in the axial direction is applied to the cam follower via the cam groove, due to the biting-in of the edge portion 63$b$ into the cam groove 11$g$, it is difficult for the slide face 63$a$ to move out of place with respect to the cam groove 11$g$ of the M-cam frame 11. At the same time, the edge portion 63$h$ bites into the shaft hole 22$f$, and it becomes difficult for the shaft portion 63$e$ to fall out from the group-2 lens frame 22. Accordingly, a good operational state of the lens barrel can be obtained. Moreover, there is no need to make the dimensions of the lens frame unnecessarily large, and the lens barrel can be made compact. In particular, if the cam follower 63 is metal and the M-cam frame 11 and the group-2 lens frame 22 are made of resin, the effects due to this biting-in are marked.

Figure 11:
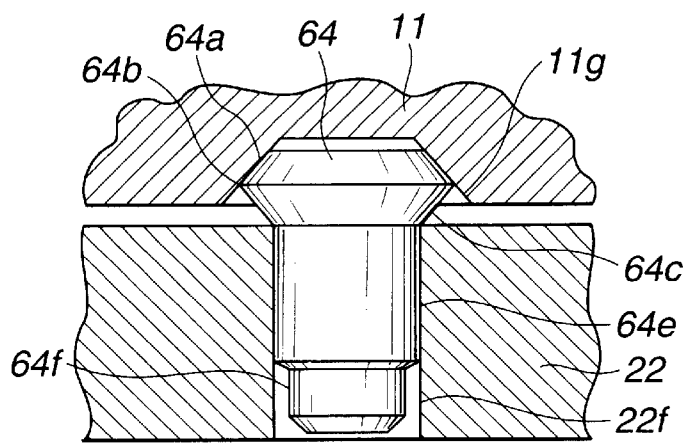
FIG. 11 is a sectional view of a fit-together state of a cam follower of a third modified example of the cam follower in the lens barrel of the embodiment of FIG. 1.

Further, a cam follower 64, which is illustrated in the sectional view of FIG. 11 illustrating an assembled state of the cam groove and the frame portion, is proposed as a third modified example of the cam followers. In the same way as the cam follower 32 illustrated in FIG. 7, the cam follower 64 is provided with a conical slide face 64a, an edge portion 64b, a shaft portion 64e, and an introduction shaft portion 64f. However, the cam follower 64 differs from the cam follower 32 in that a relief face 64c for forming the edge portion 64b is not a V-shaped groove and is merely formed as a conical face, and in that no flange portion is provided therebeneath. Note that the edge portion 64b is positioned within the slide face of the cam groove 11g.

By applying the cam follower 64, in addition to the effects achieved by the cam follower 32, a configuration is used in which there is no oblique protrusion portion beneath the relief face 64c. Thus, the depth of the cam groove 11g of the M-cam frame 11 can be made smaller, and the lens barrel can be made more compact.

Figure 12:
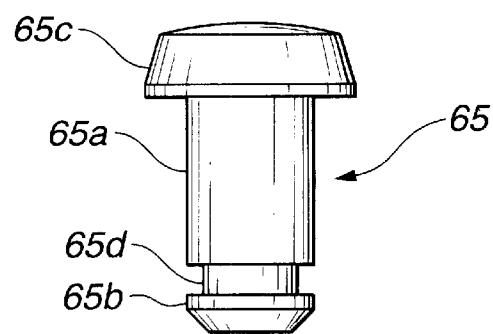
FIG. 12 is a front view of a cam follower of a fourth modified example of the cam follower in the lens barrel of the embodiment of FIG. 1.

Further, a cam follower 65, which is illustrated in the front view of FIG. 12, is proposed as a fourth modified example of the cam followers. In the same way as the cam follower 17 illustrated in FIGS. 5 and 6, the cam follower 65 has a conical slide face 65c, but the configuration of an edge portion 65b of a press-fit shaft portion 65a is different. Namely, a concave relief portion 65d of a predetermined width is provided at the shaft portion 65a, and the edge portion 65b of the same diameter as the shaft portion 65a is provided at the lower side portion of the relief portion 65d.

In a state in which the cam follower 65 is mounted by being press-fit and/or adhered into the shaft hole 22f of the group-2 lens frame 22, if an external force in the direction orthogonal to the shaft (the lateral direction) or in the axial direction (the pulling out direction) acts on the cam follower via the cam groove, the edge portion 65b bites into the shaft hole 22f. such that it is hard for the cam follower 65 to come out of place. The same effects as those of the cam follower 17 of the above-described embodiment are obtained.

Figure 13:
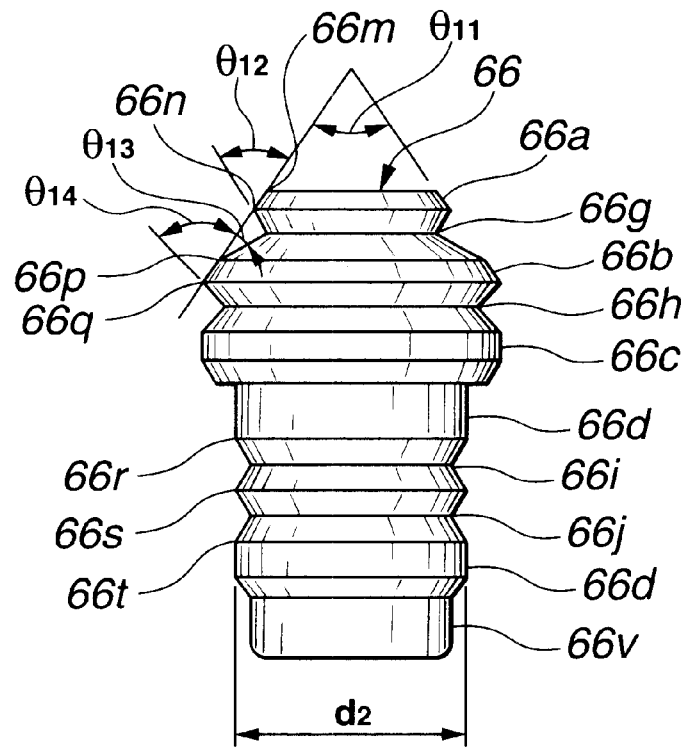
FIG. 13 is a front view of a cam follower of a fifth modified example of the cam follower in the lens barrel of the embodiment of FIG. 1.
Figure 14:
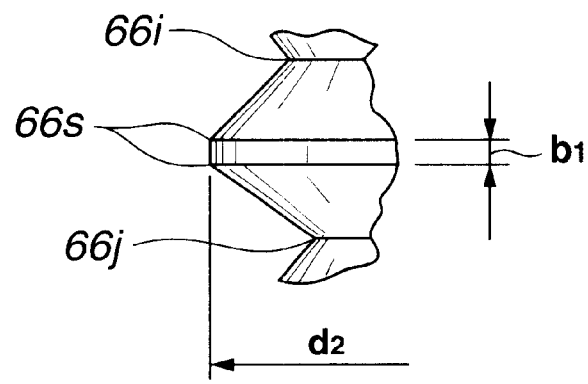
FIG. 14 is a partial enlarged view of an edge portion of the cam follower of FIG. 13.

Further, a cam follower 66, which is illustrated in the front view of FIG. 13, is proposed as a fifth modified example of the cam followers. FIG. 14 is an enlarged partial view of an edge portion of this cam follower.

The cam follower 66 has a conical slide face in the same way as the cam follower 32 illustrated in FIG. 7. However, the central portion of this conical slide face has a configuration which is notched by a V-shaped groove 66g which is a relief groove, and the lower end portion of this conical slide face has a configuration which is notched by a V-shaped groove 66h which is a relief groove. Moreover, the mounting shaft portion as well has a configuration which is notched by two V-shaped grooves 66i, 66j.

Namely, the conical slide face of the cam follower 66 is formed from conical separated slide faces 66a, 66b having a taper angle (cone generator angle) θ11. The V-shaped grove 66g is provided between these separated slide faces 66a, 66b. An edge 66n having a relief face of a relief angle θ12 is formed at the lower end of the slide face 66a. An edge 66p having a relief face of a relief angle θ13 is formed at the upper end of the slide face 66b. Moreover, the lower portion of the slide face 66b has a notched portion which is a V-shaped groove 66h. An edge 66q having a relief face of a relief angle θ14 is formed at the lower end of the slide face 66b. Beneath the V-shaped groove 66h is provided a cylindrical portion which is contained within the aforementioned conical slide face, i.e., a cylindrical face portion (flange portion) 66c whose diameter at least does not exceed that of slide face 66b.

At the cam follower 66, a shaft portion 66d having a shaft diameter d2 is provided beneath the cylindrical face portion 66c. The central portion of the shaft portion 66d is notched by two V-shaped grooves 66i, 66j. Due to these V-shaped grooves, edge portions 66r, 66s, 66t, which are ring-shaped, are formed at the outer diameter surface of the shaft portion. An introduction shaft portion 66v having a smaller diameter is formed at the distal end of the shaft portion 66d.

As illustrated in the partial enlarged view of FIG. 14, the edge portion 66s has an extremely small width portion b1 having a shaft diameter of d2. Note that the edge portion 66s, as well as the other edge portions 66n, 66q and the like, may have corner portions whose vertical sectional configurations have extremely small radii of curvature.

Figure 15:
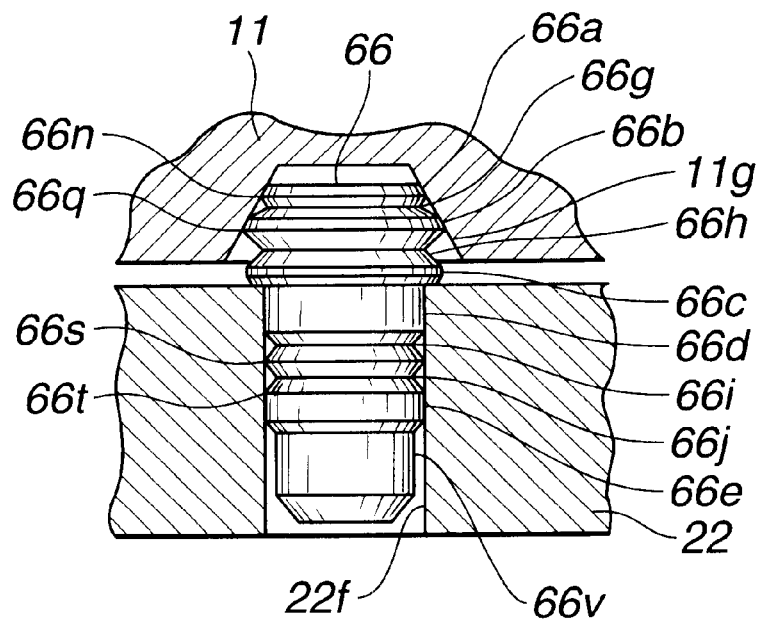
FIG. 15 is a sectional view of a fit-together state of a cam follower of the fifth modified example of the cam follower in the lens barrel of the embodiment of FIG. 1.

The sectional view of FIG. 15, which illustrates the state in which the cam groove of the cam follower and the frame portion are assembled, shows a state in which the shaft portion 66d of the cam follower 66 is fixed by being press-fit and/or adhered into the shaft hole 22f of the group-2 lens frame 22, and the slide faces 66a, 66b are inserted into the cam groove 11g of the M-cam frame 11. The cam groove 11g is similarly a cam face groove having a trapezoidal cross-section. Note that, in the above-described assembled state, the edge portions 66r, 66s, 66t are at least positioned within the shaft hole 22f, and the edge portions 66n, 66q are at least positioned within the slide face of the cam groove 11g.

In the above-described state in which the cam groove of the cam follower 66 and the frame portion are assembled, even if an external force acts between the cam follower and the cam groove in the direction orthogonal to the axial direction (i.e., in the lateral direction) or in the axial direction (i.e., in the pull-out direction), because the two edge portions 66s, 66t at the shaft portion 66d bite-into the shaft hole 22f of the group-2 lens frame 22, a strong holding force works such that the coming out of the shaft portion 66d of the cam follower can be prevented even more reliably. At the same time, a strong holding force works on the slide faces 66a, 66b of the cam follower 66 and the slide face of the cam groove 11g of the M-cam frame 11 due to the two edge portions 66n, 66q biting into the slide face of the cam groove 11g. Thus, the slide faces 66a, 66b and the cam groove 11g coming out of place due to deformation of the M-cam frame 11, the group-2 lens frame 22 or the like can be prevented even more reliably. In particular, if the cam follower 66 is metal and the M-cam frame 11 and the group-2 lens frame 22 are resin, the effects due to this biting-in a remarked.

Figure 16:
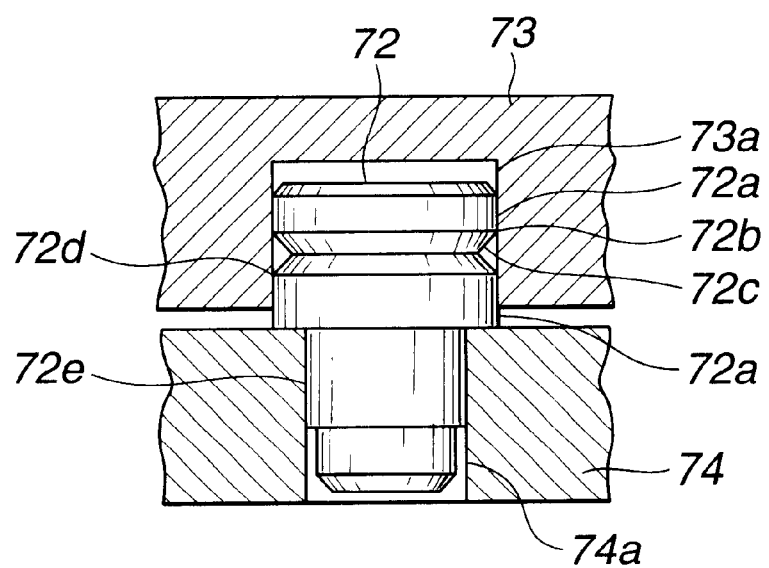
FIG. 16 is a sectional view of a fit-together state of a cam follower of a sixth modified example of the cam follower in the lens barrel of the embodiment of FIG. 1.

Further, a cam follower 72, which is illustrated in the sectional view of FIG. 16 which shows the assembled state of cam groove and the frame portion, is proposed as a sixth modified example of the cam followers. The cam follower 72 differs from the cam follower 32 shown in FIG. 7 with respect to the point that the slide face is cylindrical. Namely, the cam follower 72 has a cylindrical slide face 72a and a shaft portion 72e. The central portion of the slide face 72a is notched by a V-shaped groove 72c serving as a relief groove, such that edge portions 72b, 72d are formed.

The cam follower 72 is fixed to, for example, a frame member 74 corresponding to the above-described group-2 lens frame 22, by the shaft portion 72e being press-fit and/or adhered into a shaft hole 74a. The slide face 72a is mounted, for example, by being slidably fit into a parallel cam groove 73a of a cam frame 73 which corresponds to the above-described M-cam frame 11. Note that, in this mounted state, the edge portions 72b, 72d are positioned within the slide face of the parallel cam groove 73a.

In the above-described assembled state of the cam follower 72, when an external force is applied to the cam follower via the cam groove, due to the edge portion 72b biting into the parallel cam groove 73a, it becomes difficult for the slide face 72a to be offset from the parallel cam groove 73a in the axial direction, and shifting of the fit-together portions is prevented. In particular, if the cam follower 72 is metal and the cam frame 73 is resin, the effects due to this biting-in are marked.

Figure 17:
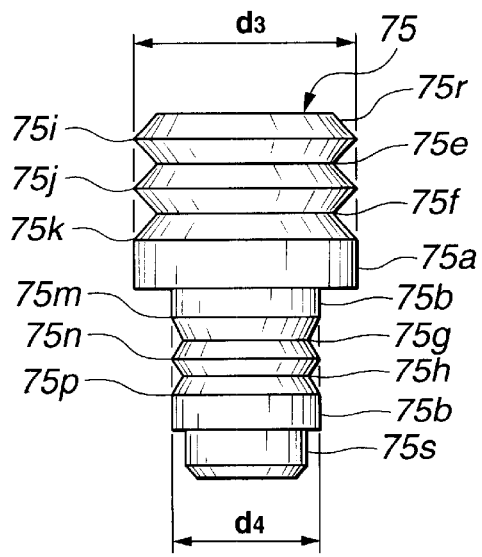
FIG. 17 is a front view of a cam follower of a seventh modified example of the cam follower in the lens barrel of the embodiment of FIG. 1.
Figure 18A:
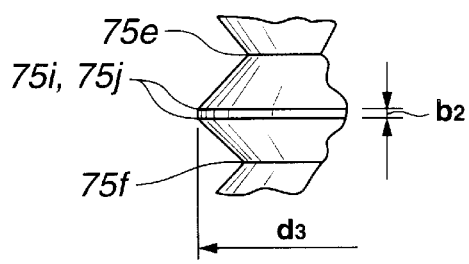
FIG. 18 (A) is a partial enlarged view of an edge portion of a slide face of the cam follower of FIG. 17.

Further, a cam follower 75, which is illustrated in the front view of FIG. 17, is proposed as a seventh modified example of the cam followers. FIGS. 18(A), (B) are partial enlarged views of edge portions of the cam follower.

The cam follower 75 has a cylindrical slide face in the same way as the cam follower 72 illustrated in FIG. 16. However, two V-shaped grooves 75e, 75f serving as relief grooves are provided above the cylindrical slide face. The mounting shaft portion as well has a configuration which is notched by two V-shaped grooves 75g, 75h.

Namely, a slide face 75a of the cam follower 75 is a cylindrical slide face having an outer diameter d3. Edge portions 75i, 75j formed by the two V-shaped grooves 75e, 75f and an upper oblique face 75r have a concentric outer diameter d3, and have, as illustrated in the partial enlarged view of FIG. 18(A), an extremely small width portion b2 of the same shaft diameter d3 as the slide face 75a. Note that the edge portions 75i, 75j may have corner portions whose vertical sectional configurations have extremely small radii of curvature.

A shaft portion 75b having a shaft diameter d4 is provided at the cam follower 75 below the cylindrical slide face 75a. The central portion of the shaft portion 75b is notched by the two V-shaped grooves 75g, 75h. Ring-shaped edge portions 75m, 75n, 75p are formed by these V-shaped grooves in the surface of the outer diameter of the shaft portion. An introduction shaft portion 75s having an even smaller diameter is formed at the distal end of the shaft portion 75b.

Figure 18B:
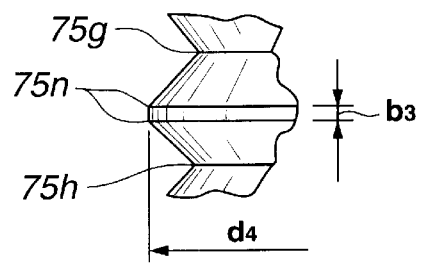

As illustrated in the partial enlarged view of FIG. 18(B), the edge portion 75n has an extremely small width portion b3 having the same shaft diameter d4 as the shaft portion 75b. Note that the edge portion 75n may have a corner portion whose vertical cross-section has an extremely small radius of curvature.

Figure 19:
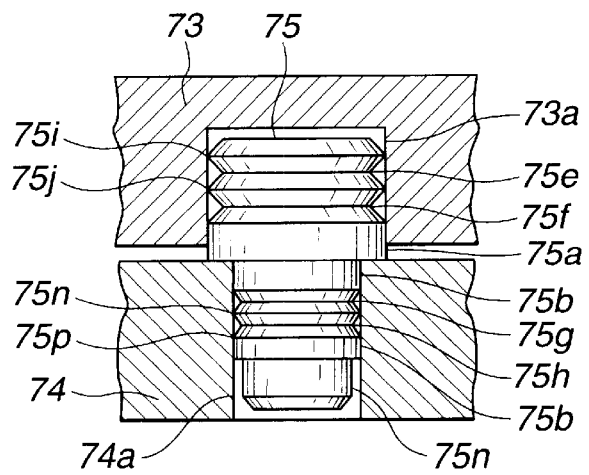
FIG. 19 is a sectional view of a fit-together state of the cam follower of the seventh modified example of the cam follower in the lens barrel of the embodiment of FIG. 1.

As illustrated in the sectional view of FIG. 19 which shows the state in which the cam groove of the cam follower and the frame portion are assembled, the cam follower 75 is fixed to the frame member 74 by the shaft portion 75b of the cam follower 75 being press-fit and/or adhered into the shaft hole 74a. The slide face 75a is mounted by being slidably fit into the parallel cam groove 73a of the cam frame 73. In this assembled state, the edge portions 75i, 75j are at least positioned within the slide face which is the cam face of the parallel cam groove 73a, and the edge portions 75n, 75p are at least positioned within the shaft hole 74a.

In the above-described mounted state of the cam follower 75, even if an external force is applied between the cam follower and the cam groove in the lateral direction or in the pulling-out direction, due to the edge portions 75i, 75j biting into the parallel cam groove 73a, the coming out of place of the fit-together portions due to shifting of the slide face 75a in the axial direction with respect to the parallel cam groove 73a of the cam frame 73 is prevented. At the same time, due to the edge portions 75n, 75p biting into the shaft hole 74a, the shaft portion 75b of the cam follower 75 is prevented from coming out from the shaft hole 74a of the frame member. In particular, if the cam follower 75 is metal and the cam frame 73 and the frame member 74 are resin, the effects due to this biting-in are marked.

In accordance with the above-described lens barrel of the present invention, a cam follower, in which a plurality of edge portions are formed at a shaft portion, is applied, and the cam follower is press-fit into and fixed to the second frame by the shaft portion. Accordingly, even if the thickness of the second frame is small and the effective length of the shaft portion is small and a pulling-out force is applied to the shaft portion via the cam portion, the coming out of the shaft portion is reliably prevented because of the biting-in due to the press-fitting of the plural edge portions.

Moreover, in accordance with the lens barrel of the present invention, plural edge portions, which abut the slide face of a cam groove, are provided at the slide face end of the cam follower which is fit-together with the cam groove of the first frame. Thus, during rotation or forward or backward movement, force of the edge portions biting into the slide face of the cam groove is generated. In particular, even if the frame deforms or attempts to deform due to rotation or forward or backward movement because the thickness of the frame is small or the rigidity of the frame is low, due to the above-described biting-in, the fit-together state of the cam follower and the cam groove can be reliably prevented from coming out of place, and good driving of the frame can be realized.

Although the present invention has been described in relation to particular embodiments thereof, many other variations and modifications and other uses will be apparent to those skilled in the art. It is preferred, therefore, that the present invention be limited not by the specific disclosure herein, but only by the appended claims.

What is claimed is:

1. A lens barrel comprising:
    a first frame having a cam groove which includes a slide face;
    a second frame moving relative to the first frame; and
    a cam follower provided at the second frame and having a cam follower slide face which slides on the slide face of the cam groove, the cam follower having at least two edges for biting-into the slide face of the cam groove on the cam follower slide face.

2. A lens barrel according to claim 1, wherein the at least two edges are formed in ring-shapes on the slide face.

3. A lens barrel according to claim 1, wherein the at least two edges are formed at a border between the slide face of the cam groove and a relief face which runs from the slide face toward the cam follower itself.

4. A lens barrel according to claim 3, wherein the relief face is formed by a conical face.

5. A lens barrel according to claim 1, wherein the cam follower slide face has a cylindrical shape.

6. A lens barrel according to claim 1, wherein the cam follower slide face has a conical shape.

7. A lens barrel according to claim 1, wherein one of the edges is at a border between a relief groove formed in the cam follower slide face, and the cam follower slide face.

8. A lens barrel according to claim 7, wherein the relief groove is a V-shaped groove.

9. A lens barrel according to claim 8, wherein the relief groove comprises plural grooves.

10. A lens barrel according to claim 9, wherein the relief grooves each comprise a V-shaped groove.

11. A lens barrel according to claim 1, wherein the second frame has a hole portion, and the cam follower has a shaft portion which is formed integrally with the cam follower and which is fit-together with the hole portion for mounting to the second frame, and a groove portion is formed in the shaft portion which is fit-together with the hole portion.

12. A lens barrel according to claim 11, wherein the groove portion of the shaft portion comprises a V-shaped groove.

13. A lens barrel according to claim 11, wherein the relief groove comprises plural grooves.

14. A lens barrel according to claim 13, wherein each of the relief grooves is a V-shaped groove.

15. A lens barrel comprising:

a frame having a hole; and a cam follower having a shaft portion provided with a plurality of edges for mounting the cam follower to the hole of the frame, the cam follower being fit-together with the hole;

wherein the shaft portion has a plurality of groove portions for forming the edges.

16. A lens barrel according to claim 15, wherein the edges are formed in ring-shapes on a surface of the cam follower.

17. A lens barrel comprising:

a frame having a hole; and a cam follower having a shaft portion provided with a plurality of edges for mounting the cam follower to the hole of the frame, the cam follower being fit-together with the hole;

wherein the cam follower has a slide face which slides on a slide face of a cam groove which is provided at another frame, and the cam follower slide face has at least two edges for biting into the slide face of the cam groove.

18. A lens barrel according to claim 17, wherein the cam follower slide face has a conical shape.

19. A lens barrel according to claim 17, wherein the edges are formed in ring shapes on the slide face of the cam follower.

20. A lens barrel according to claim 17, wherein the edges are formed at a border between the slide face of the cam groove and a relief face which runs from this slide face toward the cam follower itself.

21. A lens barrel according to claim 20, wherein the relief face is formed from a conical face.

22. A lens barrel according to claim 17, wherein the cam follower slide face has a cylindrical shape.

23. A lens barrel according to claim 17, wherein one of the edges is a border between a relief groove formed in the cam follower slide face, and the cam follower slide face.

24. A lens barrel according to claim 23, wherein the relief groove is a V-shaped groove.

25. A lens barrel according to claim 23, wherein the relief groove comprises plural grooves.

26. A lens barrel according to claim 25, wherein each of the relief grooves is a V-shaped groove.

* * * * *